(12) United States Patent
Kim et al.

(10) Patent No.: US 8,254,804 B2
(45) Date of Patent: Aug. 28, 2012

(54) MONOLITHIC SEALING MEMBER FOR IMAGE FORMING APPARATUS AND METHOD OF MANUFACTURING THE SAME

(75) Inventors: Ji-Gon Kim, Chilgok-Gun (KR); Dong-Soo Ha, Gumi-Si (KR); Moon-Ku Kang, Gumi-Si (KR); Soo-Bong Park, Gumi-Si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 551 days.

(21) Appl. No.: 12/435,498

(22) Filed: May 5, 2009

(65) Prior Publication Data

US 2010/0021199 A1 Jan. 28, 2010

(30) Foreign Application Priority Data

Jul. 23, 2008 (KR) ........................ 10-2008-0071537

(51) Int. Cl.
*G03G 15/06* (2006.01)
*G03G 15/08* (2006.01)
*G03G 21/00* (2006.01)
(52) U.S. Cl. ......... 399/103; 264/267; 399/105; 399/106
(58) Field of Classification Search .................. 264/267; 399/102, 103, 105, 106
See application file for complete search history.

(56) References Cited

U.S. PATENT DOCUMENTS

| | | | |
|---|---|---|---|
| 3,867,492 A * | 2/1975 | Drostholm | 264/46.6 |
| 5,208,634 A | 5/1993 | Ikemoto et al. | |
| 5,485,249 A | 1/1996 | Higeta et al. | |
| 5,561,504 A * | 10/1996 | Watanabe et al. | 399/111 |
| 5,809,374 A * | 9/1998 | Tsuda et al. | 399/111 |
| 6,118,958 A | 9/2000 | Nagashima | |
| 2005/0280173 A1* | 12/2005 | Wirtz et al. | 264/46.4 |
| 2007/0145634 A1* | 6/2007 | Rawlings et al. | 264/219 |

FOREIGN PATENT DOCUMENTS

| | | |
|---|---|---|
| DE | 195 14 560 | 10/1996 |
| EP | 0 485 271 | 5/1992 |
| JP | 04-009869 | 1/1992 |
| JP | 05011584 A * | 1/1993 |
| JP | 08211740 A * | 8/1996 |
| JP | 2003048944 A * | 2/2003 |

OTHER PUBLICATIONS

European Search Report issued in European Application No. EP 09 16 2288, mailed Jan. 20, 2010.
English language abstract of JP 04-009869, published Jan. 14, 1992.
English language abstract of DE 195 14 560, published Oct. 24, 1996.

* cited by examiner

*Primary Examiner* — David Gray
*Assistant Examiner* — Fred L Braun
(74) *Attorney, Agent, or Firm* — Stanzione & Kim, LLP

(57) ABSTRACT

A method for manufacturing a monolithic sealing member for an image forming apparatus, and an image forming apparatus having the monolithic sealing member are provided. The method includes applying a foamable polyurethane liquid in a portion of a housing in which three or more surfaces meet, molding the foamable polyurethane liquid in a mold and foaming the polyurethane liquid to obtain a polyurethane foam, and hardening the polyurethane foam. The foamable polyurethane liquid may be a one-pack foamable polyurethane liquid or a two-pack foamable polyurethane liquid.

10 Claims, 7 Drawing Sheets

MONOLITHIC SEALING MEMBER FOR IMAGE FORMING APPARATUS AND METHOD OF MANUFACTURING THE SAME

CROSS-REFERENCE TO RELATED APPLICATIONS

This application claims priority from Korean Patent Application No. 10-2008-0071537, filed on Jul. 23, 2008, in the Korean Intellectual Property Office, the disclosure of which is incorporated herein by reference in its entirety.

TECHNICAL FIELD

The present disclosure relates to a monolithic sealing member for an image forming apparatus and a method for manufacturing the monolithic sealing member. More particularly, the present disclosure relates to a monolithic sealing member for an image forming apparatus which has improved durability and elasticity.

BACKGROUND OF RELATED ART

An electrophotographic image forming apparatus, such as a printer, a copier, a facsimile machine or a multifunctional peripheral (MFP), includes a photosensitive medium, an exposing device to emit a laser beam onto the photosensitive medium to thereby form an electrostatic latent image corresponding to image data on the photosensitive medium, and a developing device to supply toner to the photosensitive medium to develop the electrostatic latent image formed on photosensitive medium.

The developing device includes a developing case to house toner, a developing roller, a toner supply roller, an agitator to agitate toner, a toner receptacle, a toner transfer unit and a waste toner chamber.

The developing device may also includes various sealing members to prevent toner from leaking out from rotating parts of each roller, and from portions in frictional contact with the rotating parts. These sealing members require high elastic resilience in order to maintain air-tight seals. To that end, a double-sided tape is typically attached to a sponge to fix the sponge to portions of the developing device.

For example, referring to FIG. 1C, a conventional sponge sealing member 100 is disposed in a housing 200 of an image forming apparatus, to prevent toner leakage and image contamination. The sponge sealing member 100 may be disposed in a portion of the housing 200 where three or more surfaces meet.

FIG. 1D shows a sectional view of the sponge sealing member 100. The double-sided tape 110 is attached to the bottom of the sponge sealing member 100, between an upper sponge 130 and a lower sponge 140, and between a felt portion 120 and the upper sponge 130, so that the felt portion 120, the upper sponge 130 and the lower sponge 140 are attached to each other.

However, when the housing 200 functions as a developing device and is used with the sponge sealing member 100, de-lamination may occurs in the sponge sealing member 100, which may reduce the adhesiveness of the sponge sealing member 100, which in turn, after a period of usage, result in toner scattering or leaking out during driving of the housing 200, causing image contamination.

FIG. 1A illustrates an example where two surfaces of the conventional sponge sealing member 100 are in contact with two surfaces of the housing 200. In this situation, a space is formed at the corner between the sponge sealing member 100 and the housing 200. Accordingly, toner or developer may leak out through the space from the housing 200.

FIG. 1B illustrates a conventional sponge sealing member 100 divided into two portions. Each of the two portions is attached to a respective surface of the housing 200, so it may be possible to prevent the formation of the space shown in FIG. 1A, but the manufacturing process is complicated and it is difficult to correctly attach each of the two portions of the sponge sealing member 100 to a corner between the two surfaces of the housing 200.

The problem may become more prominent when a portion of an image forming apparatus with a complicated structure, such as a corner in which three or more surfaces meet, requires sealing.

For example, it may be difficult to place the conventional sponge sealing member 100 in a portion with such complicated structure. When the sponge sealing member 100 is attached to a corner of the housing 200 in which two or more surfaces meet, the sponge sealing member 100 needs to be broken into pieces of correct sizes and/or shapes to fit into the corner. However, since the sponge sealing member 100 bends due to its elasticity, it is practically difficult to properly size the sections of the sponge sealing member 100 to sufficiently seal the corner.

For example, each of the plurality of sponge sealing members may have a thickness of about 2 mm to about 5 mm, and has a low hardness due to its elastic nature. Typically, during attachment to the housing, the sponge sealing members is held with tweezers. The use of the tweezers causes a change in the shape of the sponge sealing members, making it difficult to correctly size the sponge sealing members to fit into the corner. A space may thus be formed between the sponge sealing member 100 and the housing 200.

Conventionally, a plurality of sponge sealing members may be overlappingly attached to a housing, in order to seal a portion of the housing, for example at a corner, at which three or more surfaces. However, various problems may occur when multiple sponge sealing members are used in such a manner.

For example, when a plurality of sponge sealing members are attached to the housing, manufacturing costs may increase due to the increase in the number of sealing members. It may also be difficult to completely seal a corner between the housing and the plurality of sponge sealing members as discussed above.

Additionally, since porous sponges are used as sealing members, toner may be absorbed into the porous sponges, and may eventually leak out.

If contamination occurs inside the image forming apparatus, image contamination will continue to occur even when a new developing device housing is installed to replace the old one with its supply of toner exhausted.

FIGS. 4 and 5 illustrate a usage of sealing member in an image forming apparatus.

A sealing member 214 shown in FIG. 4 in the form of a liquid adhesive is poured onto a surface to be sealed. After a predetermined period of time has elapsed, the sealing member 214 is converted into solid, and the sealing operation is finished. A sealing member 215 shown in FIG. 5 performs the sealing operation in the same manner as that of FIG. 4. However, such sealing members 214 and 215 are sticky due to their high viscosity. It is thus difficult to properly place the sealing members 214 and 215 at a corner of a housing 200 to be sealed with the sealing members 214 and 215. A space may be formed at the corner, through which toner may leak out from the housing 200, similarly with the situation in which sealing is performed using the sponge sealing member 100 as described above.

To prevent toner leakage caused by the formation of spaces or gaps between the housing and the sealing member, there is a need to pour a large amount of a sealing material, e.g., in the form of a liquid adhesive, but it is difficult to expect a sufficient sealing effect. Therefore, a conventional sealing member in the form of a liquid adhesive is typically used to prevent toner from leaking through pores on a plane rather than for prevention of leakage through a corner having a complicated shape.

SUMMARY OF THE DISCLOSURE

According to an aspect of the present disclosure, there is provided a method for manufacturing a monolithic sealing member for an image forming apparatus, the method may include applying a foamable polyurethane liquid in a portion of a housing in which three or more surfaces meet, molding the foamable polyurethane liquid in a mold and foaming the polyurethane liquid to obtain a polyurethane foam, and hardening the polyurethane foam. The foamable polyurethane liquid may be a one-pack foamable polyurethane liquid or a two-pack foamable polyurethane liquid.

When the foamable polyurethane liquid is a one-pack foamable polyurethane liquid, nitrogen may be mixed with the foamable polyurethane liquid prior to the molding and foaming operation.

During the mixing operation, the nitrogen may be contained in an amount of about 5% by weight to about 40% by weight based on the total weight of the foamable polyurethane liquid.

The hardening operation may include hardening the polyurethane foam at a temperature of about 40° C. to about 90° C. and a humidity of about 40% to about 90%.

When the foamable polyurethane liquid is a two-pack foamable polyurethane liquid, the two-pack foamable polyurethane liquid may be prepared by mixing a first liquid containing isocyanate with a second liquid containing polyol and water in an equivalent ratio of isocyanate to polyol of 1:1 to 1.4:1.

The monolithic sealing member manufactured by the method described above may have Shore 00 hardness of about 10 to about 80. The monolithic sealing member may have substantially the same shape as a portion of a housing in which three or more surfaces meet, and may be attached to the portion of the housing.

According to another aspect, there is provided a method for manufacturing a monolithic sealing member for an image forming apparatus to be applied to a groove portion of a housing of the image forming apparatus. The method may include applying a foamable polyurethane liquid in the groove portion, molding the foamable polyurethane liquid along a wall surface of the groove portion and foaming the polyurethane liquid to obtain a polyurethane foam, and hardening the polyurethane foam. The foamable polyurethane liquid may be a one-pack foamable polyurethane liquid or a two-pack foamable polyurethane liquid.

The groove portion may be configured in the form of a polygon or cylinder.

The monolithic sealing member manufactured by the method described above may have Shore 00 hardness of about 10 to about 80. The monolithic sealing member may have the same shape as the groove portion of the housing and may be attached to the groove portion of the housing.

According to another aspect, there is provided an image forming apparatus that may include a housing, and a monolithic sealing member attached to the housing to prevent developer stored in the housing from leaking out from the housing. The housing may have a portion in which three or more surfaces meet, and the monolithic sealing member may have substantially the same shape as the portion of the housing and may be attached to the portion of the housing.

The monolithic sealing member may be polyurethane.

The monolithic sealing member may have Shore 00 hardness of about 10 to about 80.

According to another aspect, there is provided an image forming apparatus that may include a housing, and a monolithic sealing member attached to the housing. The housing may have a unit in which a groove portion is formed, and the monolithic sealing member may have the same shape as the groove portion of the housing and may be attached to the groove portion of the housing. The monolithic sealing member may be polyurethane, and may have Shore 00 hardness of about 10 to about 80.

As described above, according to exemplary embodiment of the present invention, a monolithic sealing member having improved durability and sealing characteristics is provided. Additionally, the sealing member may be manufactured by a simple manufacturing process, so the stability of manufacturing process may increase and manufacturing costs may be reduced. Furthermore, it is possible to easily manufacture a monolithic sealing member even when a portion of a housing having a complicated shape needs to be sealed, so the adhesiveness of the sealing member may increase.

BRIEF DESCRIPTION OF THE DRAWINGS

Various aspects of the present disclosure will become apparent by describing certain exemplary embodiments of the present invention with reference to the accompanying drawings, in which.

DETAILED DESCRIPTION OF SEVERAL EMBODIMENTS

Figure 1A:
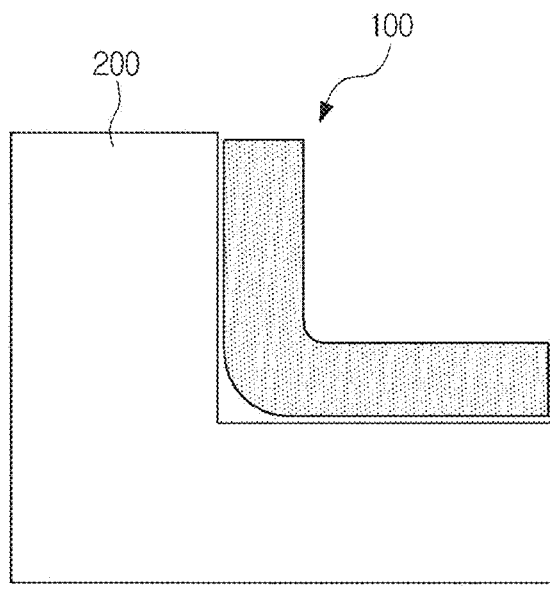
FIG. 1A is a view of a conventional sponge sealing member disposed in a housing of an image forming apparatus.
Figure 1B:
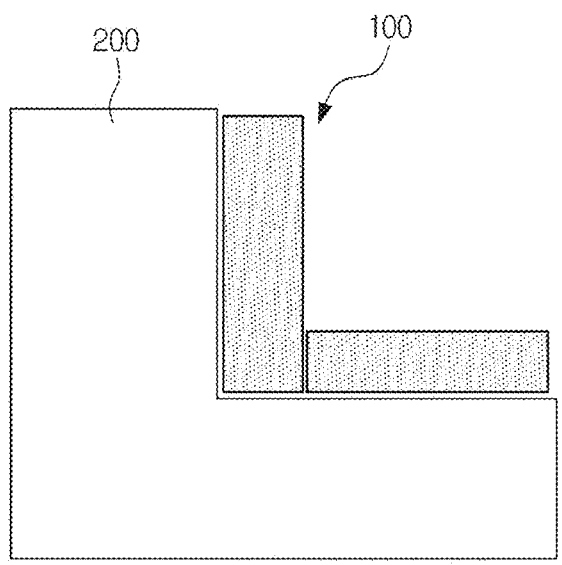
FIG. 1B is a view illustrating another example of a conventional sponge sealing member is attached to the housing of the image forming apparatus as shown in FIG. 1A.
Figure 1C:
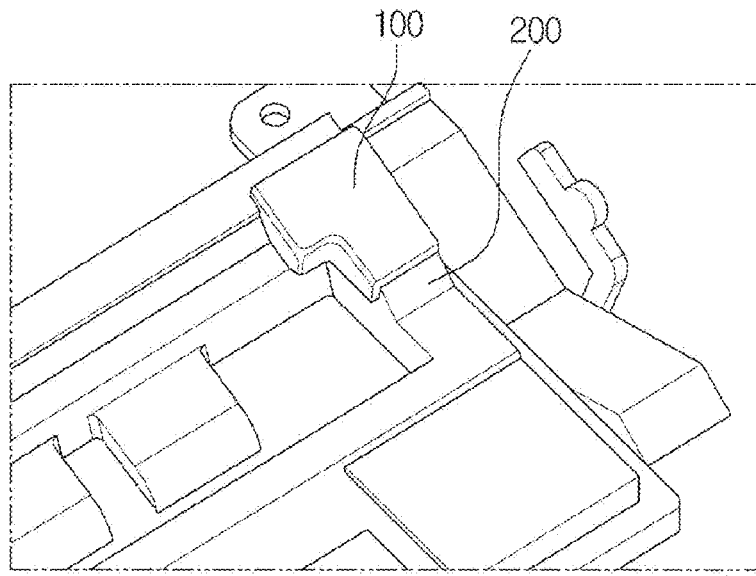
FIG. 1C is a view illustrating a conventional sponge sealing member being attached to the housing of an image forming apparatus.
Figure 1D:
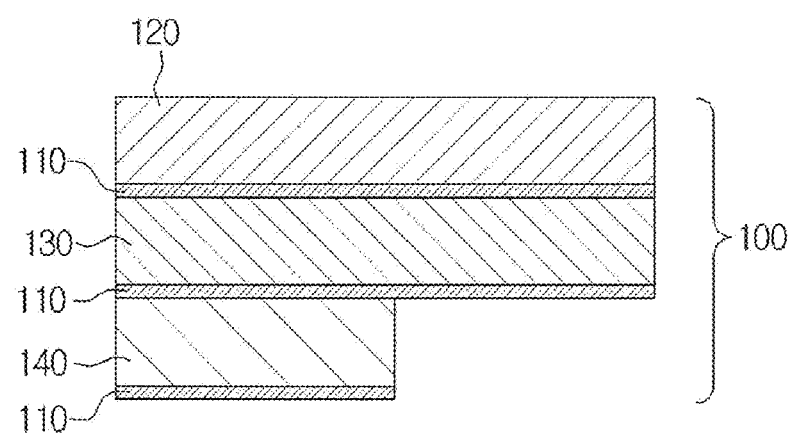
FIG. 1D is a sectional view of the conventional sponge sealing member shown in FIG. 1A.

Several embodiments of the present invention will now be described in greater detail with reference to the accompanying drawings.

In the following description, same drawing reference numerals are used for the same elements even in different drawings. The matters defined in the description, such as detailed construction and elements, are provided to assist in a comprehensive understanding of the embodiments. Thus, it should be apparent that the embodiments described herein can be carried out without those specifically defined matters. Also, well-known functions or constructions are not described in detail in order not to obscure the disclosure with unnecessary detail.

Hereinafter, a method for manufacturing a monolithic sealing member for an image forming apparatus according to an illustrative embodiment will be described with reference to FIGS. 2A to 2C.

The method may include applying a foamable polyurethane liquid in a portion of a housing in which three or more surfaces meet, molding the foamable polyurethane liquid in a mold to obtain a polyurethane foam, and hardening the polyurethane foam. The foamable polyurethane liquid may be a one-pack foamable polyurethane liquid or a two-pack foamable polyurethane liquid.

According to an embodiment, a monolithic sealing member may be formed in a portion of a housing 200 of the image forming apparatus. The portion of the housing 200 may have a complicated shape in which three or more surfaces meet, or may be a simple plane. The foamable polyurethane liquid may advantageously be applied to the portion of the housing 200 having a complicated shape, and molded in a mold.

Figure 2A:
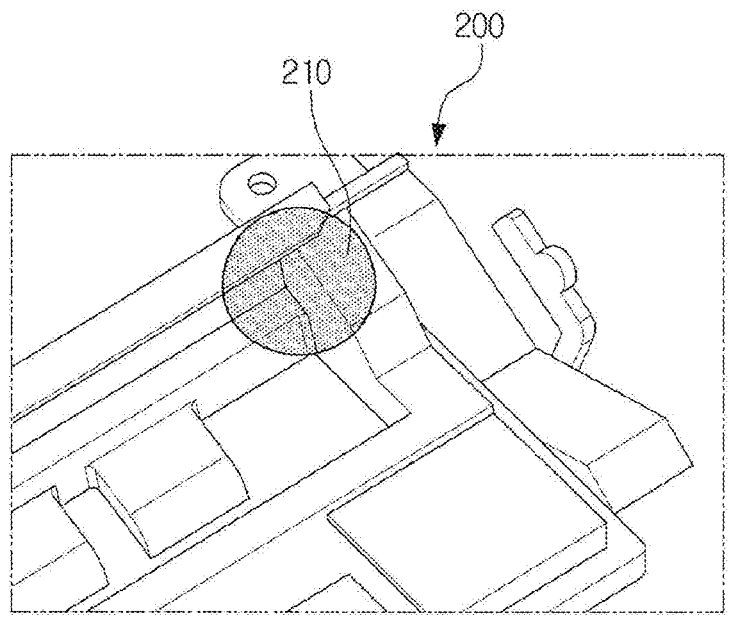
FIGS. 2A to 2C illustrate a monolithic sealing member for an image forming apparatus according to an embodiment of the present invention.
Figure 2B:
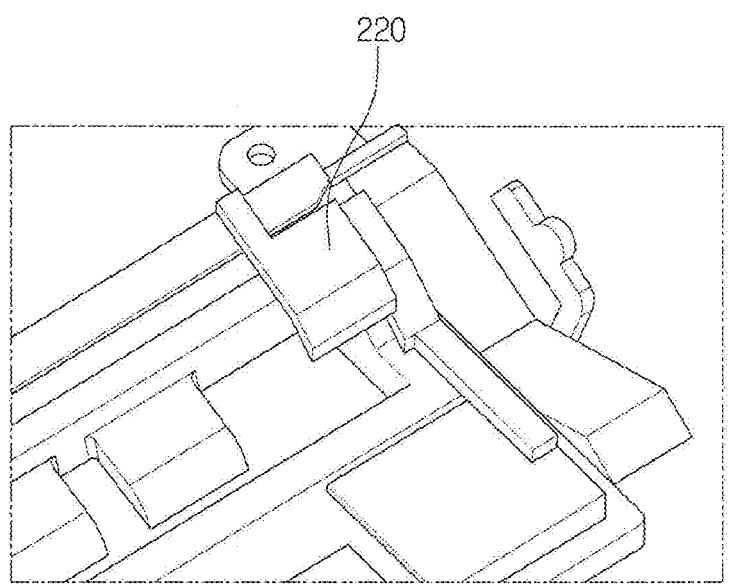
Figure 2C:
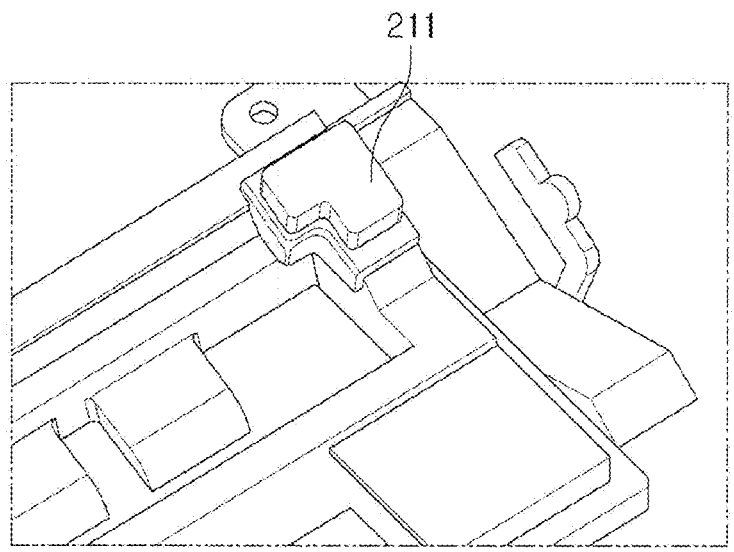

FIGS. 2A to 2C illustrate an example of a housing 200 of the image forming apparatus. The housing 200 may function as, e.g., a developing device.

Referring to FIG. 2A, foamable polyurethane liquid 210 is placed in a predetermined portion of the housing 200.

The predetermined portion of the housing 200 may be a portion having a complicated shape in which three or more surfaces meet, or may be a simpler structure, e.g., a plane, but advantages of the application of the foamable polyurethane liquid 210 may be more apparent for portions of complicated shapes.

In the conventional art described above, it is difficult for the sponge-shaped sealing member or liquid adhesive type sealing member to completely seal a corner in which three or more surfaces meet due to formation of space in the corner, so the toner may continue to leak out from the housing. However, according to an embodiment of the present invention, when a mold able to be manufactured to be correctly sized to the corner is applied to the top of the foamable polyurethane liquid 210 to mold the foamable polyurethane liquid 210, a sealing member having the same shape as the corner is formed of the foamable polyurethane liquid 210, and is attached to the corner of the housing 200. Accordingly, it is possible to obtain a sufficient sealing effect and it is thus possible to prevent toner from leaking through the corner from the housing 200.

According to the embodiment, the housing 200 having a portion in which three or more surfaces meet may be portions of components of an image forming apparatus that is capable of storing or handle toner, and from which toner may leak, and may include portions of, for example, a developer cartridge, a rotating portion of a toner transfer roller, interface portions of various housing members, or a waste toner receptacle in which waste toner from a photosensitive medium is stored.

The foamable polyurethane liquid 210 may be one-pack foamable polyurethane liquid or two-pack foamable polyurethane liquid.

A mechanism of foaming polyurethane using one-pack foamable polyurethane liquid is represented by the following reaction formulae 1 and 2.

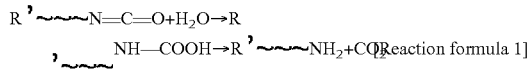
[Reaction formula 1]

In the reaction formula 1, isocyanate is reacted with water to form an unstable carbamic acid, and the carbamic acid is decomposed into amine and carbon dioxide, so that foaming is performed.

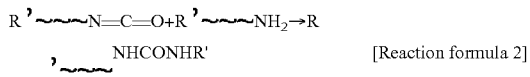
[Reaction formula 2]

In the reaction formula 2, the amine obtained by the reaction formula 1 is reacted with isocyanate to form a urea, and the formed urea maintains the shape of the polyurethane.

One-pack foamable polyurethane liquid refers to liquid type polyurethane, the molecular weight of which is increased by two-pack polymerization, and has an isocyanate group at its terminal.

If one-pack foamable polyurethane liquid is used, water in the air induces the urea reaction so as to rapidly increase the molecular weight of polyurethane, thereby hardening the polyurethane.

During a foaming operation, the one-pack foamable polyurethane liquid is molded into a predetermined shape. Additionally, nitrogen gas may be used to maintain the predetermined shape of the polyurethane. In this situation, the nitrogen gas may desirably be mixed into the foamable polyurethane liquid prior to the molding and foaming operation.

The nitrogen gas may desirably be contained in an amount of about 5% by weight to about 40% by weight based on the total weight of the foamable polyurethane liquid.

If the nitrogen gas is contained in an amount less than 5% by weight in the foamable polyurethane liquid, it may be difficult to harden the foamable polyurethane liquid. Alternatively, if the nitrogen gas is contained in an amount greater than 40% by weight in the foamable polyurethane liquid, hardening of the foamable polyurethane liquid may become quite significant due to the nitrogen gas, so that the hardness of the sealing member manufactured may be too high.

When one-pack foamable polyurethane liquid is used to manufacture a sealing member, the hardening operation may desirably be performed at a temperature of about 40° C. to about 90° C. and a humidity of about 40% to about 90%. If the hardening operation is performed under conditions other than those described above, the manufactured sealing member may set too hard or too soft.

According to the exemplary embodiment of the present invention, the foamable polyurethane liquid may be two-pack foamable polyurethane liquid.

A mechanism of polymerizing polyurethane is exemplarily illustrated by the following reaction formula 3.

[Reaction formula 3]

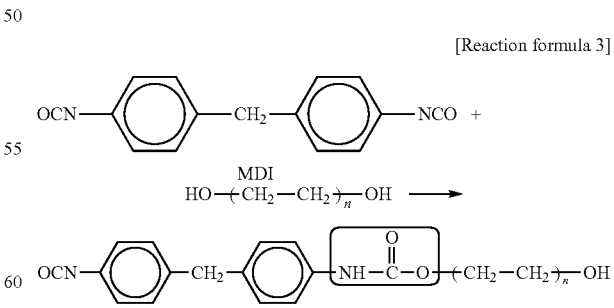

In the reaction formula 3, 4,4'-diphenylmethane diisocyanate (MDI) reacts with polyester polyol, to form polyurethane indicated by the box in the reaction formula 3.

Additionally, n in the reaction formula 3 is a natural number equal to or greater than 1.

When two-pack foamable polyurethane liquid is used, a first liquid containing isocyanate is mixed at high speed with a second liquid containing polyol and water, and the urethane reaction and urea reaction are performed simultaneously, so that the molecular weight of the polyurethane may rapidly increase. Carbon dioxide gas generated by the reaction of water with isocyanate foams the two-pack foamable polyurethane liquid while maintaining the shape of the polyurethane.

Additionally, when the first liquid is mixed with the second liquid, an equivalent ratio of isocyanate to polyol may desirably be from 1:1 to 1.4:1.

One-pack foamable polyurethane liquid or two-pack foamable polyurethane liquid may be applied to a predetermined position of an image forming apparatus, and may then be foamed with a predetermined shape.

Referring to FIG. 2B, a mold 220 is applied to the foamable polyurethane liquid 210 in the predetermined portion of the housing 200 shown in FIG. 2A. The mold 220 having a predetermined shape is used to mold a sealing member into a desired shape. The inside of the mold 220 may be coated with coating materials, such as polypropylene or polyethylene, and the mold 220 may then be applied to the foamable polyurethane liquid 210. This operation of coating the mold 220 makes it easier to remove the mold 220 from a sealing member formed by molding and foaming the foamable polyurethane liquid 210.

As shown in FIG. 2C, a sealing member 211 is formed in the predetermined portion of the housing 200, namely a portion of the housing 200 in which three or more surfaces meet, after the mold 220 has been removed. The sealing member 211 is formed of a single material and is of a monolithic type, so the sealing member 211 is able to exhibit excellent adhesiveness to a predetermined portion having a complicated shape, as shown in FIG. 2C. Accordingly, the sealing member 211 may not be detached from an apparatus, to which the sealing member 211 is applied, by, e.g., the physical force exerted by driving of the apparatus. Additionally, there is no space formed in the predetermined portion of the housing 200, so the sealing member 211 may have improved sealing properties.

Figure 3A:
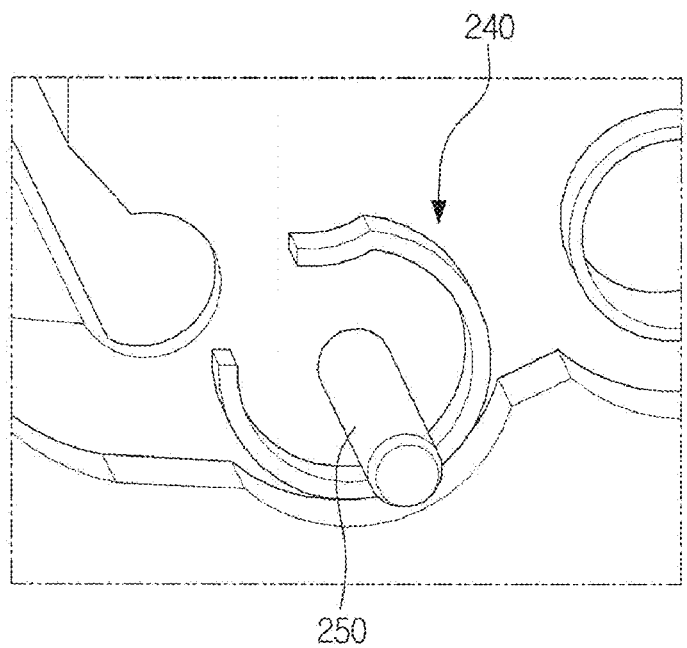
FIGS. 3A to 3C illustrate a monolithic sealing member for an image forming apparatus according to another embodiment of the present invention.
Figure 3B:
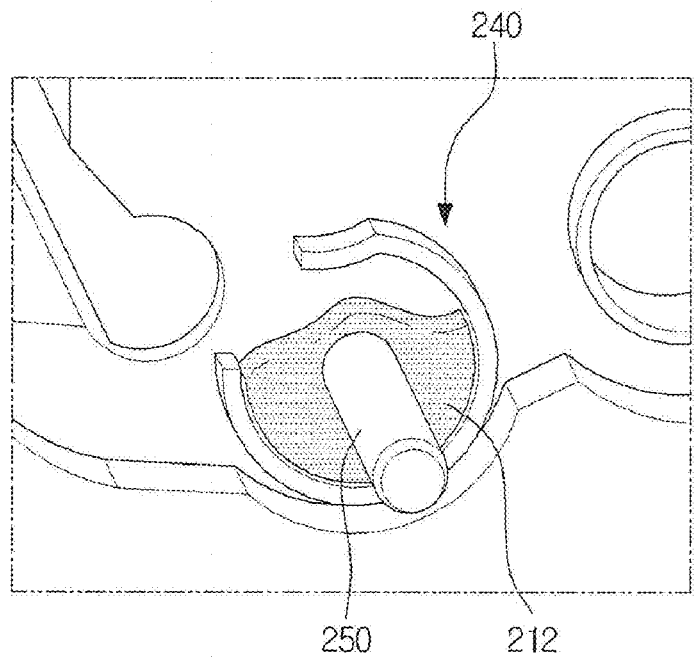
Figure 3C:
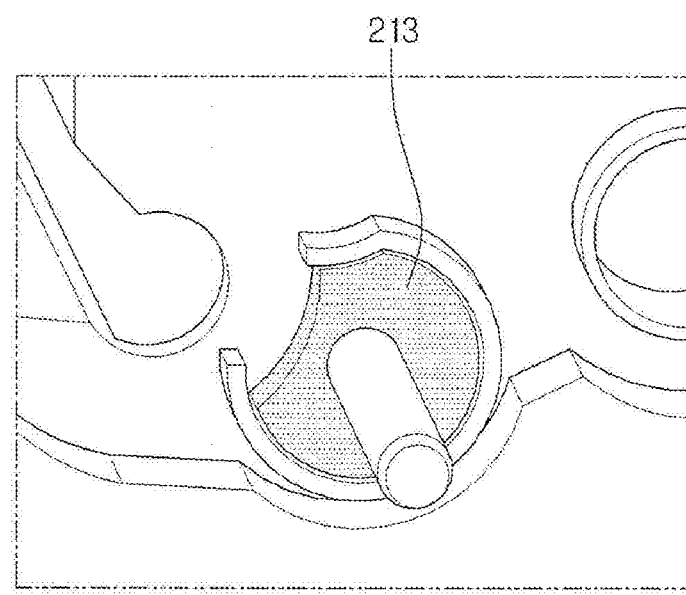
Figure 4:
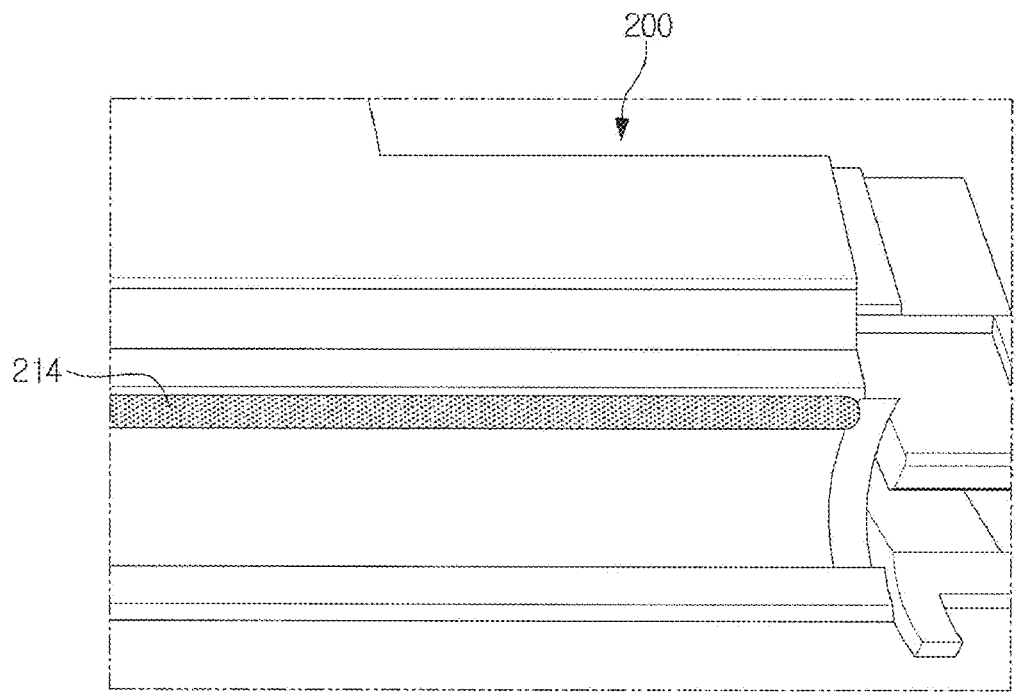
FIGS. 4 and 5 illustrate a sealing member of a conventional image forming apparatus.
Figure 5:
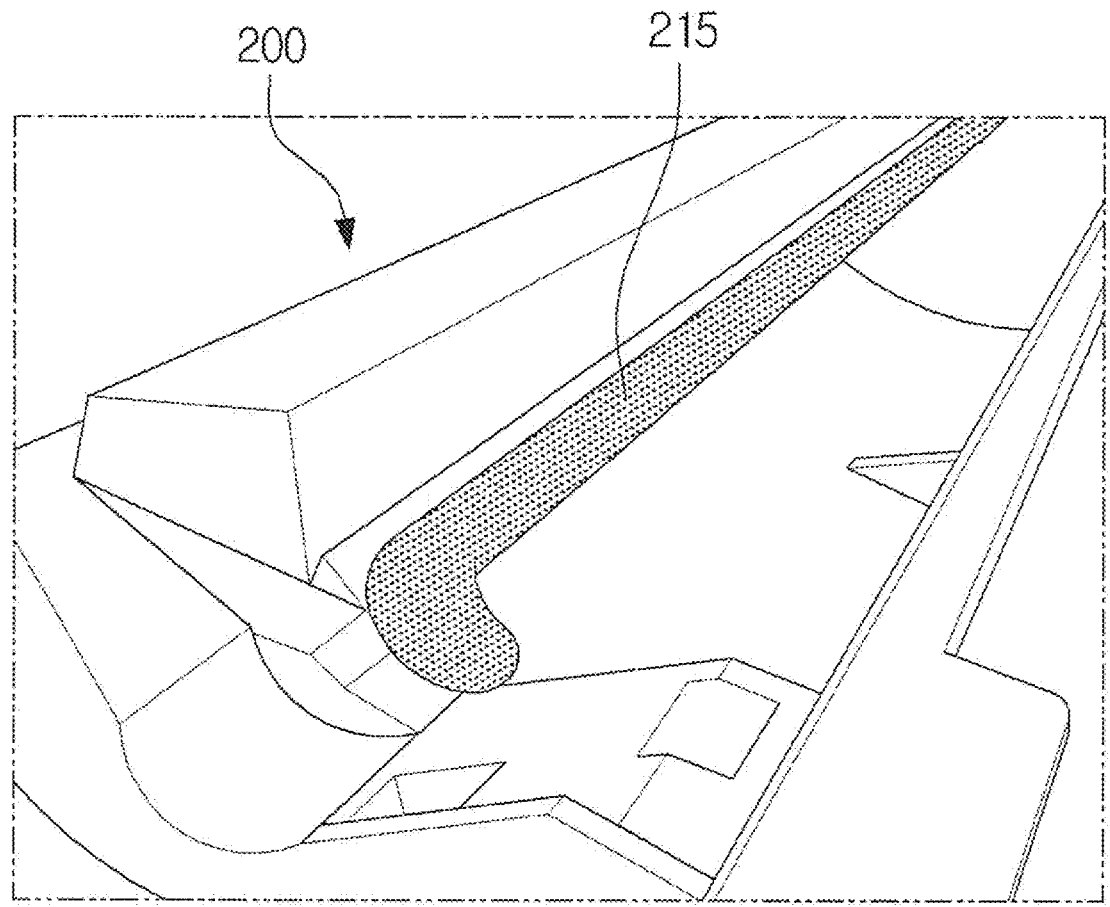

FIGS. 3A to 3C are illustrative of a method for manufacturing a monolithic sealing member for an image forming apparatus according to another embodiment.

FIG. 3A shows a roller 240 having a groove portion to which a sealing member is to be applied. While, a curved groove portion of the roller 240 is shown in FIG. 3A as an illustrative example, according to alternative embodiments, various other shapes of the groove portion, e.g., a polygon formed by multiple contact surfaces, may be possible.

Conventionally, a roller 240 may have a sponge formed around a shaft 250 attached to an image forming apparatus. However, according to an embodiment of the present invention, the roller 240 has an empty groove portion, into which a sealing member may be directly formed. The roller 240 having a cylindrical shape includes an inlet (not shown) which is formed in the rear thereof. The inlet of the roller 240 enables foamable polyurethane liquid to flow into the interior of the roller 240, namely, the groove portion of the roller 240.

The foamable polyurethane liquid 212 flows into the groove portion of the roller 240 through the inlet of the roller 240, as shown in FIG. 3B.

The flow of the foamable polyurethane liquid 212 stops as soon as the groove portion is filled with the foamable polyurethane liquid 212. Subsequently, the foamable polyurethane liquid 212 is molded and foamed inside the roller 240.

The foamable polyurethane liquid 212 then hardens so that a sealing member 213 is formed as shown in FIG. 3C. If a sealing member is manufactured in the manner described above, tighter seal may be achieved in the groove portion of the image forming apparatus, compared to a situation in which a pre-formed sealing member is attached to an image forming apparatus. Additionally, the adhesiveness between the sealing member and the wall surface of the groove portion may also increase.

The foamable polyurethane liquid 212 applied to the groove portion may be one-pack foamable polyurethane liquid or two-pack foamable polyurethane liquid.

When one-pack foamable polyurethane liquid is used, it is desirable that nitrogen be mixed into the one-pack foamable polyurethane liquid prior to the foaming and molding operations as described above. However, in this embodiment, one-pack foamable polyurethane liquid may be molded and foamed upon application in the groove portion, so nitrogen may desirably be mixed into the one-pack foamable polyurethane liquid prior to applying to the groove portion.

The mixing ratio of nitrogen to one-pack foamable polyurethane liquid may be the same as the earlier embodiments as described above. The one-pack foamable polyurethane liquid may be hardened under the same conditions as previously described.

Alternatively, when two-pack foamable polyurethane liquid is used, a mixing solution may be prepared in the same manner as previously described to form the foamable polyurethane liquid.

If a sealing member is previously formed and attached to an image forming apparatus, it is difficult to ensure correct molding. However, if foaming liquid is advantageously poured into a groove portion to manufacture a sealing member according to the embodiments herein described, the manufacturing process can be simplified, enabling mass production and/or increased precision.

The sealing member manufactured as described above is of a single member containing a polyurethane mixture rather than being of a multilayered member containing various materials, so the problems associated with de-lamination or a reduction in miscibility, e.g., a decrease in adhesiveness, may be mitigated.

The sealing member according to one or more embodiments of the present invention may desirably have Shore 00 hardness of about 10 to about 80.

The Shore hardness test measures the hardness value corresponding to the depth of impression or indentation when a weight having a diamond at a leading end thereof is dropped onto the surface. The weight may be relatively easy to handle, and causes a relatively small impression in the surface of the measured material. A Shore hardness testing apparatus or testing method may conform to the JIS standard, e.g., the JIS K 6301, and makes it simple to measure the hardness. The Shore hardness testing apparatus may include, for example. Shore A, Shore B, Shore F or Shore 00 hardness testing apparatus.

If the Shore 00 hardness of the sealing member is greater than 80, it is difficult to use the sealing member in the image forming apparatus because the sealing member has insufficient elasticity. Alternatively, if the Shore 00 hardness of the sealing member is less than 10, the sealing member is too soft, that is, has low durability, so it is difficult to use the sealing member in the image forming apparatus.

The sealing member may desirably have a hardness suitable for a position to which the sealing member is to be attached.

The sealing member manufactured by the method according to the embodiments described herein may have a closed cell structure. The closed cell structure refers to a structure completely impervious of flow of air and water, that is, to maintain a state in which pores on the surface are completely closed. With the conventional sponge sealing member with an open cell structure, air or water is absorbed into the sponge sealing member, so the durability of the sealing member is reduced, or toner is also absorbed into the sponge sealing member, which causes secondary contamination. However, the sealing member according to the embodiments has a closed cell structure, so the problems described above may not occur.

Additionally, the sealing member according to the embodiments of the present invention may maintain the elasticity of polyurethane.

The image forming apparatus according to the embodiments of the present invention includes the housing and the monolithic sealing member attached to the housing to prevent developer from leaking from the housing. The housing may have a portion in which three or more surfaces meet. The sealing member may desirably be formed of a single member having the same shape as the portion of the housing, and may be attached to the portion.

In this situation, the same shape refer to the fact that there is little empty space formed between the portion of the housing and the sealing member, which would otherwise be present due to the difference in shape therebetween. Accordingly, it is possible to prevent leakage of toner or developer.

The shape of the sealing member may not completely the same as that of the portion of the housing, but only needs to sufficiently conform to the shaped of the portion of the housing to completely seal the portion of the housing and prevent toner or developer from leaking.

Additionally, the sealing member may desirably be polyurethane. Polyurethane, as described above, may desirably have a closed cell structure and maintain its elasticity. The sealing member may desirably have Shore 00 hardness of about 10 to about 80, as described above.

The image forming apparatus according to the embodiments described herein may include the housing and the monolithic sealing member attached to the housing. The housing has a unit with a groove portion, and the sealing member is shaped to the groove portion of the housing to be a monolithic sealing member.

The sealing member may desirably be polyurethane. The sealing member may desirably have Shore 00 hardness of about 10 to about 80, as described above.

The polyurethane has been described above, so no further description thereof is required.

The sealing member may be disposed in a contact portion in which multiple surfaces meet. The contact portion may have a complicated shape, or may be a simple plane. Advantages of the sealing member described herein may be greater for those contact portions of complicated shapes. In this situation, if a groove portion is formed by multiple surfaces, foamable polyurethane liquid may be applied to the groove portion, molded, foamed and hardened so that a sealing member may be formed.

Conventionally, when a plurality of surfaces are made to contact using an adhesive, it has been difficult to expect effective adhesiveness due to the complicated structure. However, according to the exemplary embodiment of the present invention, it is possible to manufacture a sealing member through a simple manufacturing process, so as to enable the sealing member to be effectively attached to a portion having a complicated shape.

Hereinafter, the present invention will be described in detail with reference to Examples.

EXAMPLES

Example 1

An one-pack foamable polyurethane liquid was prepared.

The prepared one-pack foamable polyurethane liquid was poured into a high speed mixer, and nitrogen gas was then mixed with the one-pack foamable polyurethane liquid until the nitrogen gas was contained in an amount of about 20% by weight based on the one-pack foamable polyurethane liquid. The resulting one-pack foamable polyurethane liquid was then inserted into a developing device using a precision foaming machine equipped with a computerized numerically controlled (CNC) robot. The one-pack foamable polyurethane liquid was molded in a mold, and left for about 25 minutes in a constant temperature and humidity chamber at about 50° C. and about 80% so as to induce a urea reaction. The one-pack polyurethane foam was hardened to form a sealing member.

The formed sealing member had Shore 00 hardness of about 35.

The surface of the sealing member had substantially entirely closed-cell structure. The problem of toner leakage was not found as a result of measuring a toner leakage test after the sealing member was attached to an image forming apparatus.

Example 2

A two-pack foamable polyurethane liquid was prepared.

The two-pack foamable polyurethane liquid was prepared by mixing a first liquid containing isocyanate with a second liquid containing polyol, water and other additives in an equivalent ratio of isocyanate to polyol of 1:1.2, and by stirring the mixture at about 55000 rpm in a head of a mixer. The prepared two-pack foamable polyurethane liquid was inserted into a groove portion of a developing device using a precision foaming machine equipped with a computerized numerically controlled (CNC) robot.

The two-pack foamable polyurethane liquid was then molded in a mold while being foamed inside the groove portion, and left for about 3 minutes in a normal temperature so as to induce a urea reaction. The two-pack polyurethane foam was hardened to form a sealing member.

The formed sealing member had Shore 00 hardness of about 35.

A surface of the sealing member had substantially entirely closed-cell structure. The problem of toner leakage was not found as a result of measuring a toner leakage test after the sealing member was attached to an image forming apparatus.

The foregoing embodiments and advantages are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A monolithic sealing member for an image forming apparatus manufactured by a method, the method comprising:

applying a foamable polyurethane liquid in a portion of a housing of the image forming apparatus in which three or more surfaces meet;

molding the foamable polyurethane liquid in a mold and foaming the polyurethane liquid to obtain a polyurethane foam; and hardening the polyurethane foam, wherein the monolithic sealing member has Shore 00 hardness of between about 10 to about 80, the monolithic sealing member having a shape substantially conforming to the portion of the housing, the monolithic sealing member being attached to the portion of the housing.

2. A method of manufacturing a monolithic sealing member for an image forming apparatus, comprising:

applying a foamable polyurethane liquid in a portion of a housing in which three or more surfaces meet;

molding the foamable polyurethane liquid in a mold and foaming the polyurethane liquid to obtain a polyurethane foam; and hardening the polyurethane foam, wherein the foamable polyurethane liquid is one of a one-pack foamable polyurethane liquid and a two-pack foamable polyurethane liquid, wherein the foamable polyurethane liquid is a two-pack foamable polyurethane liquid, wherein the two-pack foamable polyurethane liquid is prepared by mixing a first liquid containing isocyanate with a second liquid containing polyol and water in an equivalent ratio of isocyanate to polyol of 1:1 to 1.4:1.

3. A method of manufacturing a monolithic sealing member for an image forming apparatus, comprising:

applying a foamable polyurethane liquid in a portion of a housing in which three or more surfaces meet;

molding the foamable polyurethane liquid in a mold and foaming the polyurethane liquid to obtain a polyurethane foam;

hardening the polyurethane foam, wherein the foamable polyurethane liquid is one of a one-pack foamable polyurethane liquid and a two-pack foamable polyurethane liquid, wherein the foamable polyurethane liquid is a one-pack foamable polyurethane liquid; and mixing nitrogen with the foamable polyurethane liquid prior to the molding and foaming step, wherein the nitrogen is contained in an amount of between about 5% by weight to about 40% by weight based on the total weight of the foamable polyurethane liquid.

4. The method as claimed in claim 3, wherein the hardening operation comprises hardening the polyurethane foam at a temperature of between about 40° C. to about 90° C. and a humidity of between about 40% to about 90%.

5. A method of manufacturing a monolithic sealing member for an image forming apparatus having a housing that includes a groove portion, comprising:

applying a foamable polyurethane liquid in the groove portion;

molding the foamable polyurethane liquid along a wall surface of the groove portion and foaming the polyurethane liquid to obtain a polyurethane foam;

hardening the polyurethane foam, wherein the foamable polyurethane liquid is one of a one-pack foamable polyurethane liquid and a two-pack foamable polyurethane liquid, wherein the foamable polyurethane liquid is a one-pack foamable polyurethane liquid; and mixing nitrogen with the foamable polyurethane liquid prior to the molding and foaming step, wherein the nitrogen is contained in an amount of between about 5% by weight to about 40% by weight based on the total weight of the foamable polyurethane liquid.

6. The method as claimed in claim 5, wherein the groove portion is configured in the form of a polygon or a cylinder.

7. A monolithic sealing member for an image forming apparatus manufactured by a method, the method comprising:

applying a foamable polyurethane liquid in a groove portion of a housing of the image forming apparatus;

molding the foamable polyurethane liquid along a wall surface of the groove portion and foaming the polyurethane liquid to obtain a polyurethane foam; and hardening the polyurethane foam, wherein the monolithic sealing member has Shore 00 hardness of between about 10 to about 80, the monolithic sealing member having a shape substantially conforming to the groove portion of the housing, the monolithic sealing member being attached to the groove portion of the housing.

8. An image forming apparatus, comprising:

a housing; and a monolithic sealing member attached to the housing, wherein the housing has a unit in which a groove portion is formed, the monolithic sealing member having a shape substantially conforming to the groove portion of the housing, the monolithic sealing member being attached to the groove portion of the unit, and wherein the monolithic sealing member is polyurethane, and has Shore 00 hardness of between about 10 to about 80.

9. An image forming apparatus comprising:

a housing; and a monolithic sealing member attached to the housing to prevent developer stored in the housing from leaking out from the housing, wherein the housing has a portion in which three or more surfaces meet, the monolithic sealing member having a shape substantially conforming to the portion of the housing, the monolithic sealing member being attached to the portion of the housing, wherein the monolithic sealing member is polyurethane, wherein the polyurethane is mixed with nitrogen, and the nitrogen is contained in an amount of between about 5% by weight to about 40% by weight based on the total weight of the polyurethane.

10. The image forming apparatus as claimed in claim 9, wherein the monolithic sealing member has Shore 00 hardness of between about 10 to about 80.

* * * * *